United States Patent [19]
Soshi et al.

[11] Patent Number: 5,400,110
[45] Date of Patent: Mar. 21, 1995

[54] CAMERA HAVING POWERED ZOOM LENS

[75] Inventors: Isao Soshi; Toshiyuki Kitazawa, both of Tokyo, Japan

[73] Assignee: Asahi Kogaku Kogyo Kabushiki Kaisha, Tokyo, Japan

[21] Appl. No.: 193,603

[22] Filed: Feb. 7, 1994

Related U.S. Application Data

[63] Continuation of Ser. No. 806, Jan. 4, 1993, abandoned, which is a continuation of Ser. No. 655,531, Feb. 14, 1991, abandoned.

[30] Foreign Application Priority Data

Feb. 14, 1990 [JP] Japan .................. 2-33016

[51] Int. Cl.⁶ .............. G03B 13/18; G03B 7/085
[52] U.S. Cl. .................. 354/402; 354/400; 354/446
[58] Field of Search ............ 354/400, 402, 403, 446, 354/453, 195.1, 195.12, 409, 410, 195.11, 195.13

[56] References Cited

U.S. PATENT DOCUMENTS

| | | | |
|---|---|---|---|
| 4,231,646 | 11/1980 | Iida et al. | 354/195 |
| 4,290,679 | 9/1981 | Vockenhuber | 354/196 |
| 4,465,352 | 8/1984 | Hirobe et al. | 354/406 |
| 4,534,636 | 8/1985 | Sugawara | 354/403 |
| 4,571,048 | 2/1986 | Sugawara | 354/403 |
| 4,829,331 | 5/1989 | Aihara | 354/195.1 X |
| 4,870,439 | 9/1989 | Tsuboi et al. | 354/195.12 |
| 4,878,080 | 10/1989 | Takehana et al. | 354/403 |
| 4,942,417 | 7/1990 | Miyazawa et al. | 354/195.1 X |
| 4,951,075 | 8/1990 | Tokumaru et al. | 354/195.1 |
| 4,962,400 | 10/1990 | Otani et al. | 354/195.1 |
| 4,963,000 | 10/1990 | Kawai | 354/400 X |
| 4,994,843 | 2/1991 | Kitazawa | 354/409 |
| 5,089,841 | 2/1992 | Yamada | 354/402 |
| 5,146,261 | 9/1992 | Soshi | 354/402 |

FOREIGN PATENT DOCUMENTS

| | | |
|---|---|---|
| 3437145 | 4/1986 | Germany . |
| 3810504 | 10/1989 | Germany . |
| 63-303311 | 4/1989 | Japan . |
| 2077448 | 12/1980 | United Kingdom . |
| 2196134 | 4/1988 | United Kingdom . |

OTHER PUBLICATIONS

English Language Translation of German Office Action dated Dec. 15, 1992.
English language abstract of JP 63-303,311.

Primary Examiner—Michael L. Gellner
Assistant Examiner—Jae N. Noh
Attorney, Agent, or Firm—Sandler Greenblum & Bernstein

[57] ABSTRACT

A camera having a powered zoom lens, including a memory for storing object distances of more than one object to be photographed simultaneously, detected by an object distance measuring device, and a powered zoom lens controller for varying the focal length of the powered zoom lens so that the objects are within the depth of field of the powered zoom lens.

19 Claims, 2 Drawing Sheets

CAMERA HAVING POWERED ZOOM LENS

This application is a continuation of application Ser. No. 08/000,806, filed Jan. 4, 1993, now abandoned which is a continuation of Ser. No. 07/655,531, filed Feb. 14, 1991, now abandoned.

BACKGROUND OF THE INVENTION

1. Field of the Invention

The present invention relates to a camera having a powered zoom lens and, more particularly, to a powered zoom lens camera having a depth-of-field priority zoom mode.

2. Description of Related Art

In recent cameras, various photographic techniques have been automated. One example is a depth-of-field priority mode which coordinates the necessary tasks related to focusing when a plurality of objects are to be taken. More specifically, in this depth-of-field priority mode, two or more objects at different object distances are in focus.

In one known camera having such a depth-of-field priority mode, the different object distances are stored in a memory after both the focusing operations and the object distance measuring operations, or after only the object distance measuring operations, have been carried out by an automatic focusing device for the different objects in the composition. Thereafter, the brightness of the objects is measured by a photometer to determine optimum exposure values, and the optimum exposure values are input to a control unit of the camera together with the focal length data. From there, based on the data input thereto, the control unit performs arithmetic operations for obtaining the focused object distance and the diaphragm value so that the objects can be made to fall within the depth of field.

However, in the camera mentioned above, only the focused object distance and the diaphragm are controlled. Therefore, it is very difficult to accurately bring the objects of different object distances into focus, particularly in the cases where a photographic lens with a long focal length is used, an object at a close distance is to be photographed, or a dark object is to be photographed.

SUMMARY OF THE INVENTION

The primary object of the present invention is to provide a powered zoom lens camera having a depth-of-field priority photographic mode in which the focus can be correctly adjusted even when using a photographic lens with a long focal length or when photographing a dark object or at a close object distance.

The present invention is based upon the fact that the depth of field increases as the focal length decreases, and that powered zoom lens cameras have become readily available.

To achieve the object mentioned above, according to the present invention there is provided a camera having a powered zoom lens which has a memory means for storing object distances of more than one object to be photographed at one time, and an object distance measuring device for detecting the distance of the object to be photographed, as well as a powered zoom lens control means for varying the focal length of the powered zoom lens so that the objects fall within the depth of field of the powered zoom lens.

With this arrangement, the depth of field can be controlled in accordance with not only the diaphragm data, but also the focal length data and, accordingly, dark objects or objects at a close object distance can be brought within the depth of field.

The present disclosure relates to subject matter contained in Japanese patent application No. 02-33016(filed on Feb. 14, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
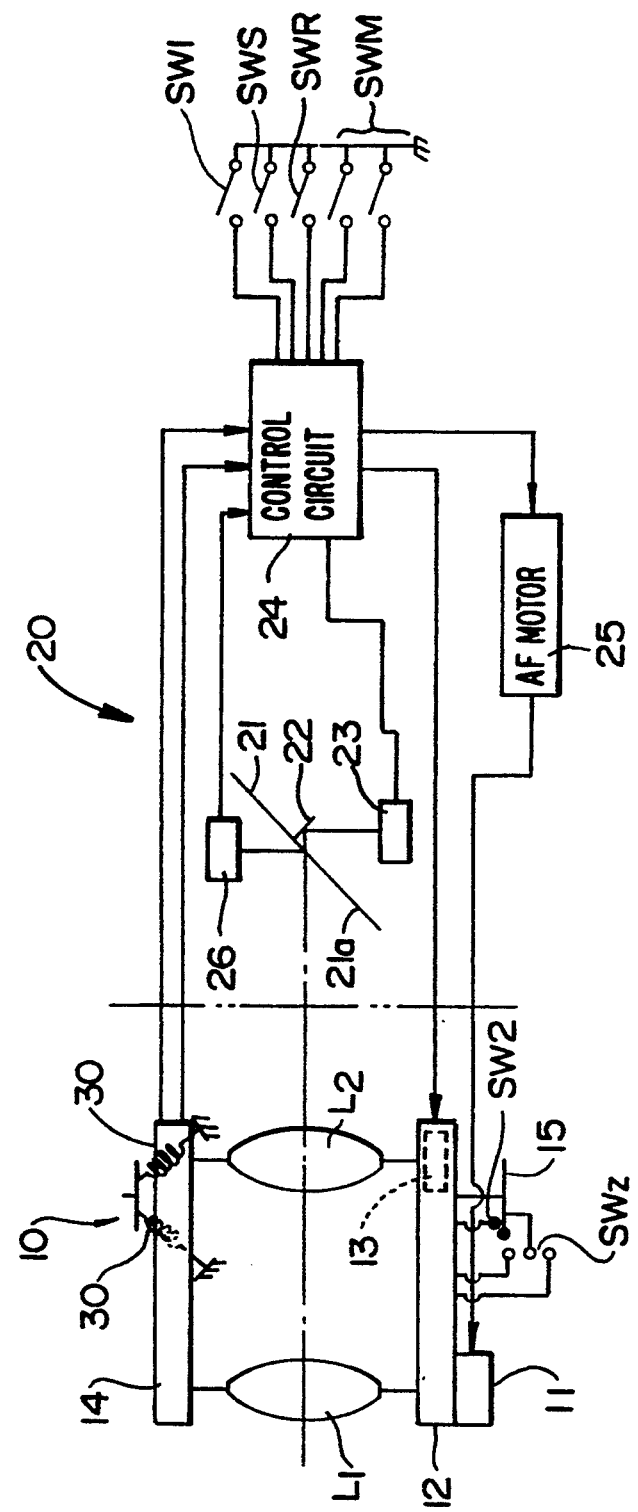
FIG. 1 is a block diagram of a single-lens reflex camera having a powered zoom lens, an object distance measuring device, an automatic focusing device and an automatic exposure device, according to the present invention; and, FIG. 2 is an operational flow chart of the single-lens reflex camera shown in FIG. 1.

FIG. 1 is a block diagram of the main components of a single-lens reflex camera having a depth-of-field priority zoom photographic mode, to which an embodiment of the present invention is applied. The single-lens reflex camera has a powered zoom lens, an object distance measuring device, an automatic focusing device and an automatic exposure device.

The powered zoom lens 10 has a first lens group L1 and a second lens group L2. The first and second lens groups L1 and L2 move in the optical axis direction to vary tile spatial distance therebetween and thereby change the focal length thereof. The first lens group L1 solely moves in tile optical axis direction to adjust the focus.

The first lens group L1 is driven by a focus adjustment mechanism 11 to adjust the focus. The first and second lens groups L1 and L2 are driven by a zoom mechanism 12 to vary the focal length. The drive mechanisms 11 and 12 can be comprised of cam mechanisms which are known per se. In the illustrated embodiment, the focus adjustment mechanism 11 is driven by an AF motor 25 provided on a camera body 20. The zoom mechanism 12 is driven by a zoom motor 13 incorporated therein.

The focused object distance data and the focal length data of the zoom lens 10 are read by a lens-position detecting means 14 and are output to the camera body 20 through pins (not shown) provided on a mount.

The zoom lens 10 is provided with a zoom operation ring 15 which functions as a powered zoom switch and a manual zooming ring. The zoom operation ring 15 can rotate and move in the optical axis direction to selectively occupy three positions.

The zoom operation ring 15 is associated with a zoom switch SWZ when it is located in one of the axial end positions, designated as the power zoom position. The zoom switch SWZ which is usually kept an inoperative position (OFF position) is turned ON, when the zoom operation ring 15 is rotated in the clockwise or counterclockwise direction to drive the zoom motor 13 of the zoom mechanism 12, so that the first and second lens groups L1 and L2 are moved in the optical axis direction toward a telephoto position or a wide-angle position in accordance with the direction of the rotation of the zoom motor 13.

At the power zoom position, the zoom operation ring 15 is mechanically disconnected from the zoom mechanism 12 (cam ring), and the zoom operation ring 15 is biased and kept in an intermediate angular position by springs 30.

The zoom operation ring 15 is functionally connected to the zoom mechanism 12 (cam ring) at the other axial end position, designated as the manual zoom position, in which the zoom switch SWZ cannot be turned ON and the zoom motor 13 is mechanically disengaged from the zoom mechanism 12. In this manual zoom position, when the zoom operation ring 15 is rotated in a clockwise or counterclockwise direction, the first and second lens groups L1 and L2 are moved in the optical axis direction toward the telephoto position or the wide-angle position in accordance with the direction of rotation of the zoom operation ring.

When the zoom operation ring 15 is in an intermediate axial position (neutral position), it cannot be rotated and a detection switch SW2 is turned ON to mechanically disengage the zoom operation ring 15 from the zoom mechanism 12, so that no zoom switch SWZ can be turned ON.

The selective disconnection between the zoom operation ring 15 and the zoom mechanism 12 and between the zoom mechanism 12 and the zoom motor 13 is realized, for example, by a frictional clutch mechanism or a toothed clutch mechanism or an equivalent well-known mechanism.

The zoom lens 10 is attached to the camera body 20. A portion of the light rays from the object to be photographed which are transmitted through the first and second lens groups L1 and L2 are transmitted through a half mirror portion 21a of a main mirror 21 and reflected by an auxiliary mirror 22. The reflected light is made to fall upon a CCD object distance measuring sensor 23 which is of a phase difference detection type that outputs to a control circuit 24. Phase difference data of an object image is divided into two images. The control circuit 24 performs an arithmetic operation to predict the defocus amount, based on the phase difference data. As a result, the AF motor 25 drives the focus adjustment mechanism 11 to complete the focusing operation. The control circuit 24 is usually comprised of a microcomputer which generically controls the whole operation of the camera in accordance with the program stored in an internal memory.

The present invention does not specifically refer to means for obtaining object distance information, nor to means for driving the AF motor 25 based on the object distance information. However, the object information can be obtained, for example, by an object distance measuring device based on the triangulation method.

Some of the beams of light reflected by the main mirror 21 toward a finder (not shown) are made to fall on a photometering sensor 26 which detects the luminance of the object and sends the luminance signal to the control circuit 24.

The control circuit 24 actuates the zoom motor 13 of the zoom mechanism 12 to effect the zooming operation.

The focused object distance data D (the object distance data the results when the object to be taken is in focus) and the focal length data f are input to the control circuit 24 from the lens-position detecting means 14.

The camera body 20 has an object distance and luminance-detection switch SWS which is actuated to detect the object distance and the object luminance, a release switch SWR which is actuated to drive the mirror 21, a shutter (not shown) and a diaphragm (not shown) to effect the exposure, and a mode selection switch SWM which selects the depth-of-field priority mode. Also, the camera body 20 has a set switch SW1 which sets and commences desired operations at a constant magnification mode. These switches are connected to respective input ports of the control circuit 24.

Figure 2:
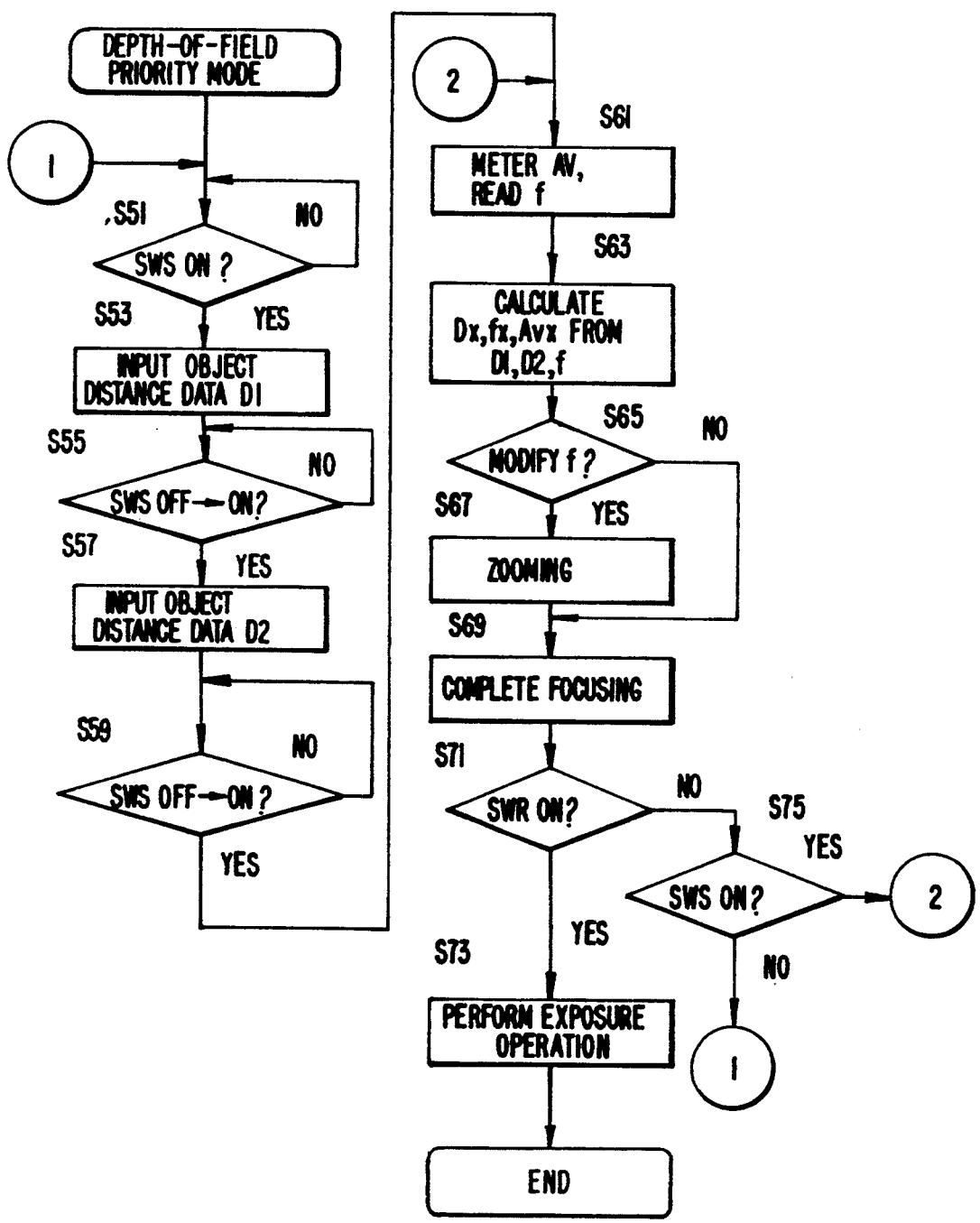

The following discussion will be directed to a basic photographic operation of the camera in the depth-of-field priority mode, with reference to FIG. 2 which shows the flow chart of the operation, by way of example. The operation is effected by the control circuit 24 in accordance with the programs stored in a ROM 40 incorporated therein.

In the flow chart shown in FIG. 2, when the depth-of-field priority mode is selected by the mode selection switch SWM, the control circuit 24 is interrupted by the operation of the object distance and luminance measuring switch SWS (step S51). A photographer first determines a composition of a picture and then directs the camera to one of the closest and farthest objects and pushes the release switch by a half step to turn on the object distance and luminance measuring switch SWS.

When the object distance and luminance measurement switch SWS is turned ON, the control circuit 24 commences the first automatic focusing operation (the measuring of the object distance and the focusing operation). The object distance and luminance measurement switch SWS is automatically turned OFF when it is released. When the focusing is completed, the object distance data D1 is input through the lens-position detecting means 14 to be stored. The control waits until the object distance and luminance measurement switch SWS is changed from OFF to ON (steps S53 and S55). In the above processes, the following formula is used to express the relation between the object distance D and the focal length f:

$$D = f^2/(x' + \Delta x)$$

where: $\Delta x$ is the distance of lens advancement from the position where the lens is in infinitive focus $x'$ is a defocus amount (vector) obtained by the CCD object distance measuring sensor 23 and the control circuit 24

When the object distance and luminance measurement switch SWS is turned ON, the control circuit 24 performs the second automatic focusing operation. When the focusing is completed, the object distance data D2 is input to the lens-position detecting means 14 to be stored (S57). The photographer directs the camera to the other object and releases the release button. After that, the photographer pushes the release button again by a half step to turned ON the object distance and luminance measurement switch SWS which is automatically turned OFF when the pushing force is removed.

Once the two object distance data D1 and D2 have been memorized, the control circuit 24 does not operate until the object distance and luminance measurement switch SWS is turned ON (S59). The photographer then releases the release button and returns the camera to a position corresponding to the desired composition mentioned above and pushes the release button thereafter by a half step.

When the object distance and luminance measurement switch SWS is turned ON, the control circuit 24 starts metering the object luminance to obtain optimum exposure factors (diaphragm value Av and shutter speed Tv) in accordance with a predetermined program and receives the focal length data f therein from the lens-position detecting means 14 (S61).

After these data are input and memorized, the control circuit 24 includes arithmetic operation means 24' which calculates an object distance Dx in accordance with the focal length f and the diaphragm value Av, so that the two object distances D1 and D2 fall within the depth of field (S63). In this calculation, if the object distance D1 or D2 is not within tile depth of field, the diaphragm value Av is increased to deepen the depth of field. If the object distance D1 or D2 is still not within the depth of field, even after tile diaphragm value Av has been increased to a predetermined value, tile focal length f is varied to increase tile depth of field ( that is, to shorten the focal length f), so that the focal length f becomes a desired focal length fx at which the object distances D1 and D2 are brought within the depth of field.

In connection with the above operations, the Judgment as to whether or not the object is within the depth of field is effected based on the following arithmetic formulas:

$$D1 = f^2 Dx / [f^2 + (Dx - f)\delta' Av]$$

$$D2 = f^2 Dx / [f^2 - (Dx - f)\delta' Av]$$

where:
Dx is the object distance;
D1 is the closest point in the depth of field;
D2 is the farthest point in the depth of field;
$\delta'$ is the permissible circle of confusion;
Av is tile diaphragm value.

Consequently, it is clear from the above formulas that Av and/or f can be varied so that the two object distances D1 and D2 are within the depth of the field.

From the above two formulas, it is known that the depth of the field D1 and D2 can be obtained as follows under the condition of Dx being a short distance:

$$D2 - D1 = \frac{2 \cdot f^2 \cdot Dx \cdot (Dx - f) \cdot \delta' \cdot Av}{f^4 - (Dx - f)^2 \cdot (\delta')^2 \cdot Av}$$

since $Dx - f \approx Dx$, $$D2 - D1 = \frac{2 \cdot \delta' \cdot Av \cdot Dx^2 \cdot f^2}{f^4 - Dx^2 \cdot (\delta')^2 \cdot Av^2}$$

If the object is located in a short distance (about meters from the camera), $f \gg \delta'$, then the above equation will be:

$$D2 - D1 = \frac{2 \cdot \delta' \cdot Av \cdot Dx^2}{f^2}$$

According to this formula,
1) since the depth of field is approximately proportional to the square of the object distance, the shorter the focal length becomes, the deeper the depth of field will be.
2) since the depth of field is approximately proportional to the diaphragm value Av, the larger F becomes (stopping down to the smaller diaphragm diameter), the deeper the depth of field will be.

Due to the above arithmetic operations, when the two object distances D1 and/or D2 are not within the depth of field, the control circuit 24 operates to make the diaphragm diameter smaller, and/or to make the focal length shorter so that the two object distances are within the depth of field.

In this embodiment, the diaphragm value Av is varied first to locate the optimum depth of field, after which the focal length is varied. However, in the present invention, the focal length could be firstly varied to locate the optimum depth-of-field.

Upon completion of the arithmetic operation mentioned above, the control circuit 24 judges whether or not the focal length f should be modified (S65). If the focal length f should be modified at step S65, the zoom mechanism 12 is driven to control the zooming, so that the focal length f becomes fx (S67). Thereafter, the AF motor 25 is driven to bring the objects in focus (focused object distance Dx) at step S69. If no modification of the focal length is necessary at step S65, the control proceeds to step S69 to effect the focusing without performing the zooming.

Upon completion of the focusing, the control circuit 24 performs the exposure operation when the release switch SWR is turned ON (steps S71 and S73) and the control thus ends.

Conversely, if no release switch SWR is turned ON, the control is returned to steps S61 and S51 when the object distance and luminance measurement switch SWS is turned ON and OFF, respectively (step S75).

As can be understood from the foregoing, according to the present invention, if a plurality of objects to be taken are not within the depth of field in the depth-of-field priority mode, the diaphragm first stops down. If the objects are still not within the depth of field even after the stopping down, the zooming is controlled to shift to the wide-angle side to deepen the depth of field so that the objects of different object distances can be brought into focus.

It should be appreciated that upon zooming in a single-lens reflex camera, the composition can be directly observed through the finder prior to the operation of the release button and, accordingly, the photographer can take a picture with or without modification of the setting.

Although the above discussion has been directed to a single-lens reflex camera, the present invention is not limited thereto and can also be applied to a lens shutter type camera. In summary, the present invention can be generically applied to a camera which has a powered zoom lens, an automatic focusing device including an object distance measuring device, and an automatic exposure device.

We claim:
1. A camera having a powered zoom lens, comprising:
an object distance measuring device for detecting distances of a plurality of objects to be photographed at one time, said plurality of objects being at different distances;
memory means for storing object distances detected by said object distance measuring device;
driving means for changing the focal length of the power zoom lens; and
power zoom lens control means for controlling said driving means, in response to a determination that at least one of the objects to be photographed is not within a depth of field of the powered zoom lens, to vary the focal of the powered zoom lens to a focal length which ensures that all of said plurality of objects to be photographed are within a depth of field, which is determined by the variation in the focal length and said object distances which are stored in said memory means.

2. A powered zoom lens according to claim 1, further comprising an arithmetic operation means for calculating an optimum diaphragm value, an optimum object distance when the objects are in focus, and an optimum focal length so as to bring the objects within the depth of field.

3. A powered zoom lens camera according to claim 2, wherein said arithmetic means further operates to move the diaphragm value to a side where the F number becomes larger.

4. A powered zoom lens camera according to claim 1, wherein said powered zoom lens being operated by said powered zoom lens control means is moved in a direction so that the focal length becomes shorter.

5. A powered zoom lens camera according to claim 1, wherein said powered zoom lens is provided with a zoom operation ring which functions as a power zoom switch and a manual zooming ring.

6. A powered zoom lens camera according to claim 5, wherein said zoom operation ring is rotatable and is movable in an optical axis direction of the powered zoom lens between two axial end positions.

7. A powered zoom lens camera according to claim 6, wherein said powered zoom lens has a zoom switch which is associated with said zoom operation ring when the latter is located in one of the axial end positions thereof.

8. A powered zoom lens camera according to claim 7, wherein said zoom switch is normally located in an inoperative position and is turned ON when the zoom operation ring is rotated in a clockwise direction or a counterclockwise direction to move the powered zoom lens in the optical axis direction in accordance with the direction of the rotation of the zoom operation ring.

9. A powered zoom lens camera according to claim 8, further comprising a spring means for biasing the zoom operation ring, so that the latter is kept in a neutral position of the rotational movement thereof when the zoom operation ring is located in one of the two axial end positions.

10. A powered zoom lens camera according to claim 1, further comprising a mode selection switch which is actuated to select the depth-of-field priority mode.

11. A camera having a power zoom lens, comprising:
memory means for storing object distances of more than one object to be taken at one time, detected by an object distance measuring device, said object distances varying from one another;
control means for varying depth of field of the powered zoom lens in accordance with said stored object distances by adjusting at least one of a focal length and a diaphragm value of the powered zoom lens to a focal length and a diaphragm setting which ensure that all of the objects represented by said varying object distances fall within a depth of field which is determined by said object distances stored in said memory means and the variation in at least one of the focal length and diaphragm value and
arithmetic operation means for conducting arithmetic calculations to obtain a diaphragm value, object distances in focus, and focal length so that more than two object distances stored in said memory means fall within the depth of field.

12. A powered zoom lens camera according to claim 11, wherein said arithmetic operation means conduct arithmetic calculations to vary the diaphragm value so as to make the F number larger.

13. A powered zoom lens camera according to claim 11, wherein said powered zoom lens, of which the focal length is varied by the powered zoom lens control means, is moved in a direction so that the focal length becomes shorter.

14. A camera having a powered zoom lens comprising:
object distance measuring means for detecting distances of a plurality of objects to be photographed at one time, said plurality of objects being at different distances from said camera;
driving means for changing a focal length of the powered zoom lens;
control means for controlling said driving means to drive said powered zoom lens for varying a depth of field of said powered zoom lens in accordance with said measured object distances, by changing a focal length of said powered zoom lens such that all of the plurality of objects to be photographed at one time are within a depth of field of said powered zoom lens.

15. The camera having a powered zoom lens according to claim 15, further comprising means for determining whether the plurality of objects are within a depth of field of said powered zoom lens at a predetermined focal length, said control means being operative to change the focal length of said powered zoom lens in response to a determination that the plurality of objects are not within a depth of field of said powered zoom lens at said predetermined focal length.

16. The camera having a powered zoom lens according to claim 15, further comprising means for determining whether the plurality of objects are within a depth of field of said powered zoom lens, and means, responsive to a determination that said plurality of objects are not within a depth of field of said powered zoom lens, for changing a diaphragm value of said powered zoom lens to increase the depth of field of said powered zoom lens.

17. The camera having a powered zoom lens according to claim 17, further comprising means for determining if the plurality of objects are within a depth of field of said powered zoom lens when said diaphragm value has been changed to a maximum diaphragm value, and, in response to a determination that the plurality of objects are not within the depth of field at said maximum diaphragm value, controlling said driving means for changing the focal length of said powered zoom lens in a direction to bring the plurality of objects within a depth of field.

18. The camera having a powered zoom lens according to claim 15, further comprising memory means for storing object distances measured by said object distance measuring means.

19. The camera having a powered zoom lens according to claim 15, further comprising a zoom operation ring, said zoom operation ring being mounted for rotation about an optical axis of said powered zoom lens, and for movement along the optical axis of said powered zoom lens, and a zoom switch positioned for cooperation with said zoom operation ring when said zoom operation ring is located at a predetermined position along the optical axis.

* * * * *

UNITED STATES PATENT AND TRADEMARK OFFICE
CERTIFICATE OF CORRECTION

PATENT NO. : 5,400,110
DATED : March 21, 1995
INVENTOR(S) : Isao SOSHI et al.

It is certified that error appears in the above-indentified patent and that said Letters Patent is hereby corrected as shown below:

At column 8, line 28 (claim 15, line 2), change "claim 15" to ---claim 14---.
At column 8, line 37 (claim 16, line 2), "claim 15" should be changed to ---claim 14---.
At column 8, line 46, (claim 17, line 2), "claim 17" should be changed to ---claim 16---.
At column 8, line 56, (claim 18, line 2), "claim 15" should be changed to ---claim 14---.
At column 8, line 60, (claim 19, line 2), "claim 15" should be changed to ---claim 14---.
At column 8, line 60 (claim 19, line 2), change "zoom .operation" to ---zoom operation---.

Signed and Sealed this

Twenty-third Day of April, 1996

Attest:

BRUCE LEHMAN

Attesting Officer    Commissioner of Patents and Trademarks